Sept. 21, 1943.        G. W. SCHATZMAN        2,329,945
LOCKING ASSEMBLY FOR AUTOMOBILE WHEELS AND PARTS THEREOF
Filed Feb. 6, 1942        2 Sheets-Sheet 1
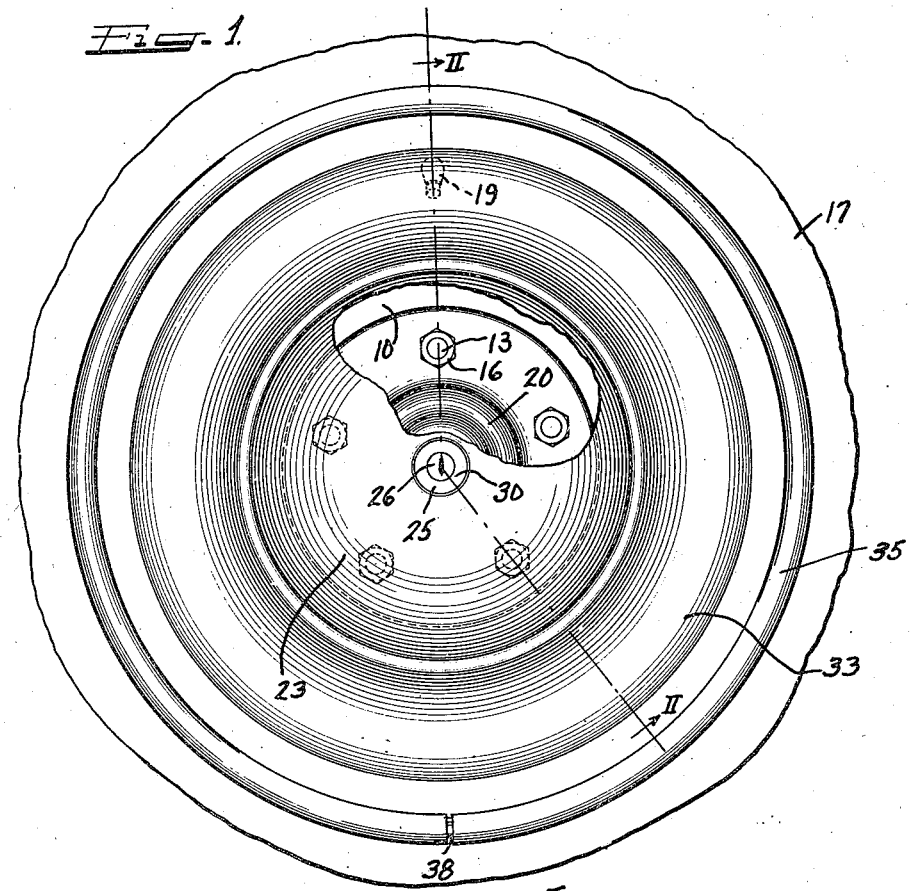
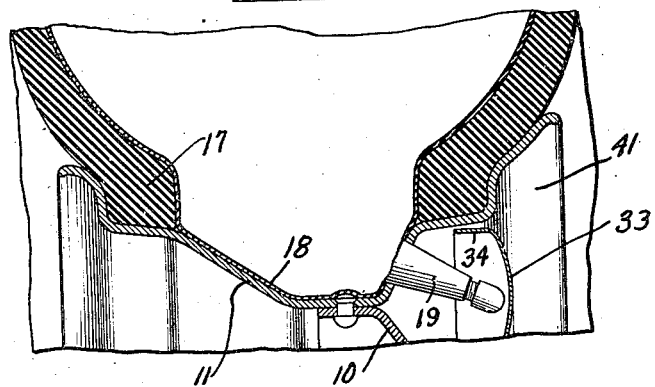
Inventor
GEORGE W. SCHATZMAN.

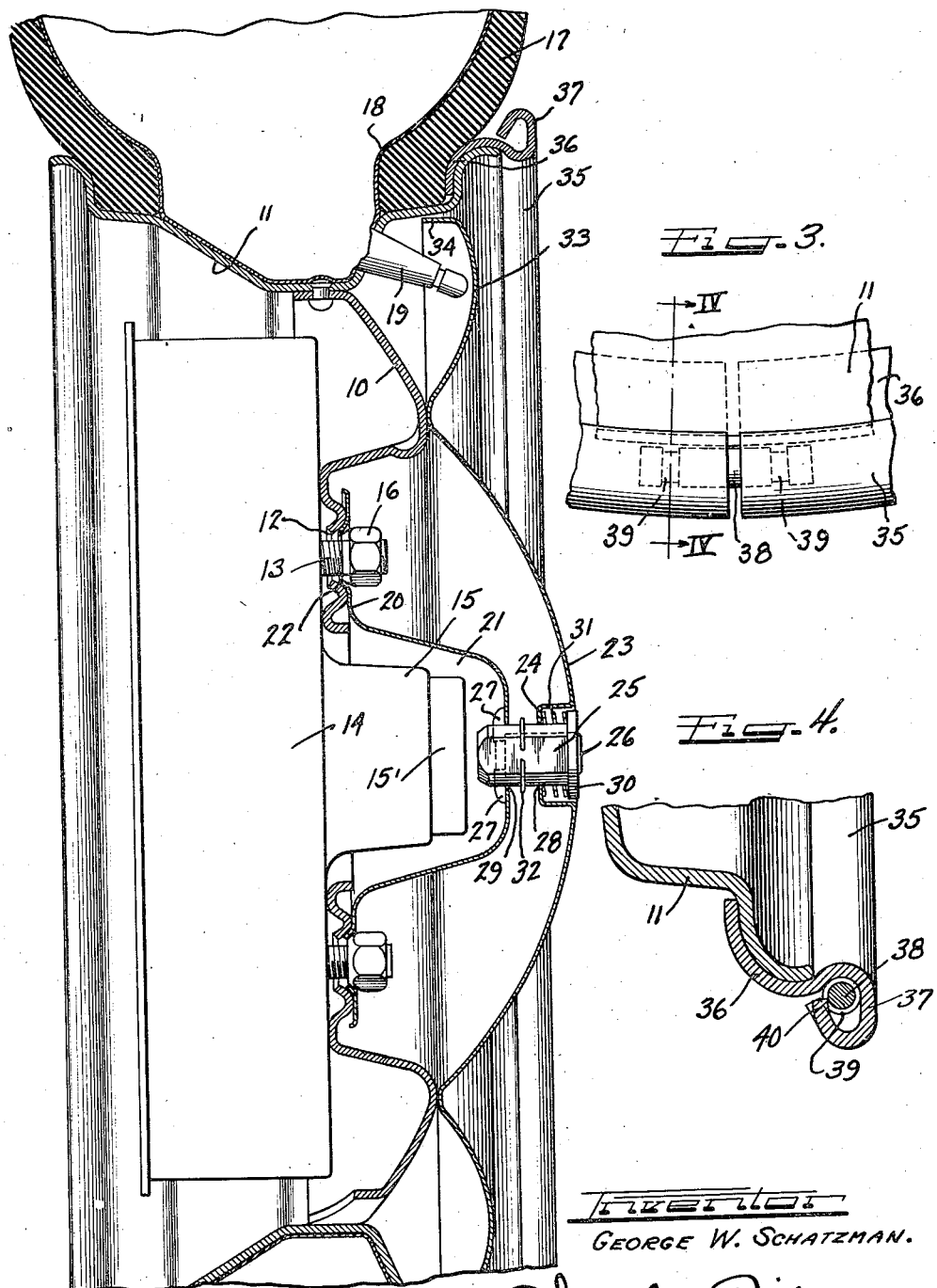

Patented Sept. 21, 1943

2,329,945

UNITED STATES PATENT OFFICE 2,329,945

LOCKING ASSEMBLY FOR AUTOMOBILE WHEELS AND PARTS THEREOF

George W. Schatzman, Detroit, Mich., assignor to Houdaille-Hershey Corporation, Detroit, Mich., a corporation of Michigan Application February 6, 1942, Serial No. 429,773

2 Claims. (Cl. 301—97)

My invention relates to locking assembly for frustrating and preventing unlawful removal of wheels from automotive vehicles or the removal of tires from the wheels for purposes of theft.

The object of my invention is to provide simple but efficient locking assembly which will frustrate the removal of a wheel from the car, or the removal of the tire from the wheel. More specifically, I provide means for locking the wheel securing bolts against access, and locking the tire nipple against access to prevent deflation of the tire through the nipple, and other means for making it impossible to remove the tire, even when deflated, outwardly off the wheel rim so that the tire cannot be stolen unless the wheel itself is detached from the car.

The various features of my invention are incorporated in the structure shown on the drawings in which—

Figure 1 is a front elevation of a wheel with the locking element applied thereto;

Figure 2 is an enlarged section on plane II—II of Figure 1;

Figure 3 is a front view of the end of a tire locking ring showing the means for securing the ends together;

Figure 4 is a section on plane IV—IV of Fig. 3; and

Figure 5 is a section like Fig. 2 showing a modified arrangement of tire locking means.

The wheel shown is of the well known type comprising the annular sheet metal disk 10 to which the rim 11 is secured and which has the spaced bolt holes 12 for receiving the threaded studs 13 extending from the brake drum 14 from which extends the hub 15 which receives the spindle (not shown) supported from the vehicle axle, a nut (not shown) at the outer end of the spindle holding the hub structure thereto. At their outer ends the studs 13 receive the nuts 16 for securing the disk 10 to the brake drum. The rim 11 supports the rubber tire 17 from the inner tube 18 of which extends the nipple 19.

The locking assembly comprises an inner cover structure 20 of sheet metal which is deflected at its middle portion to provide the recess 21 for receiving the outer end of the hub 15, the cover structure at its outer part having the holes 22 in alignment with the bolt holes 12 so that the nuts 16 may function to hold the cover structures secured against the disks 10 and to the brake drum. When this inner cover structure is provided, the hub cap (not shown), which would ordinarily be applied to the end 15' of the hub, can be discarded.

An outer locking cover or cap 23 of sheet metal has an outwardly domed middle portion whose central portion is deflected inwardly to form a housing 24 for a lock cylinder 25 in which a tumbler barrel 26 is operable by a proper key for withdrawing one or more locking bolts 27 radially into the cylinder against spring means (not shown) tending to shift these bolts outwardly. This tumbler lock structure is of the well known type and therefore need not be specifically described. At its inner end the housing 24 has the passageway 28 for aligning with the passageway 29 in the outer end of the inner cover structure 20 through which passageway the lock cylinder may be inserted. At its outer end the lock cylinder has the flange 30 between which and the inner end of the housing 24 is interposed a spring 31 tending to shift the cylinder outwardly, such outward shift being limited by the engagement of stops 32 on the cylinder with the housing 24. The outer cover 23 when applied seats against the wheel disk 10 and the lock cylinder is then shifted axially inwardly for extension through the passageway 29 in the inner cover structure 20, the lock tongues 27 being beveled at their outer edges so that, as the cylinder is shifted through the passageway 29, they will be cammed into the cylinder and will then be shifted out by their springs to engage behind the front wall of the cover structure 20, as clearly shown on Fig. 2. The spring 31 which was compressed by the application of the lock cylinder to the inner cover 20 will exert pressure against the outer cover 23 to hold it seated against the wheel disk. Upon insertion of a key in the lock barrel and turning thereof, the tongues 27 will be withdrawn and the spring 31 will shift the cylinder outwardly for release of the outer cover 23. The outer cover 23 when locked in position will frustrate and prevent access to the bolts 16 for removal of the wheel from the car.

The outer cover 23 may be extended to form the outer portion 33 of convex cross section with its end 34 fitting into the outer side of the rim 11. This portion 33 will then cover and enclose the tire nipple 19 so that, when the cover structure 23 is locked to the inner cover structure 20, access to the nipple for deflation and removal of the tire from the rim will be frustrated. The bowed and convex section of the outer cover structure and the engagement of its end 34 into the outer side of the wheel rim will make it very difficult to distort or displace the locked outer cover structure for access to the nipple.

As a further means for frustrating removal of the tire, even when deflated, I provide a locking ring 35 of substantially ogee cross section, the ring being split so that it may be spiralled onto the rim before the tire is applied. The inner portion 36 of the ring is arcuate to hook around and fit against the inner side of the outer lip of the rim, while the outer portion 37 of the ring is of circular or oblong cross section to stiffen the ring. After application of the locking ring it is contracted snugly against the rim lip and its ends locked together by a pin 38 extending into the ends of the outer portion 37, the pin having the annular channels 39 at its ends into which portions 40 of the ring are deflected, as best shown on Fig. 4, to thus hold the ring closed. When the ring is applied to the rim its outer portion 37 will extend radially such distance beyond the rim that the tire can be applied to the rim only from the inner side of the wheel, and the tire, even when deflated, cannot be withdrawn from the rim outwardly of the wheel but can be removed only inwardly. However, after such removal of the tire inwardly of the wheel while on the car, the tire will surround the car axle and therefore cannot be stolen. Before the tire can be stolen, after removal thereof inwardly from the wheel on the tire, the wheel must be detached, but this is frustrated by the locked cover 23 which prevents access to the wheel securing nuts 16.

With the separate locking ring shown on Figs. 1 to 4, it would be very difficult and almost impossible to remove the ring from the rim for the purpose of removing the tire outwardly from the rim. Fig. 5 shows a modified arrangement which can be used instead of the separate locking ring. In ths modified arrangement the outer lip part 41 of the rim is extended sufficiently radially so that it will be impossible to remove the tire, even when deflated, outwardly from the rim.

I have shown practical and efficient embodiment of my invention but I do not desire to be limited to the exact construction and arrangement shown and described as changes and modifications are possible which would still come within the scope of the invention.

I claim as follows:

1. The combination with an automobile wheel having a tire supporting rim of the type comprising inner and outer flanges of radial extent which would ordinarily permit removal of a deflated tire from the rim in either direction, of a locking ring primarily open at one point so that it may be spiraled on to the rim into position before the tire is applied thereto, said ring being of substantially ogee cross section with its inner portion of arcuate cross section to fit snugly against the inner side of the outer flange of the rim, and with its outer portion of tubular cross section, a locking pin extending into the adjacent ends of the tubular portion of said ring and rigidly secured thereto to prevent opening of the ring and to clamp it radially to the rim, the tubular portion of said ring extending radially beyond said outer flange a distance just sufficient to prevent removal of the deflated tire from the rim outwardly of the wheel whereby to prevent theft of the tire when the wheel is on its axle.

2. The combination with an automobile wheel having a tire supporting rim of the type comprising inner and outer flanges of radial extent which would ordinarily permit removal of a deflated tire from the rim in either direction, of a locking ring primarily open at one point so that it may be spiraled on to the rim into position before the tire is applied thereto, said ring being of substantially ogee cross section with its inner portion of arcuate cross section to fit snugly against the inner side of the outer flange of the rim, and with its outer portion of tubular cross section, a locking pin extending into the adjacent ends of the tubular portion of said ring and rigidly secured thereto to prevent opening of the ring and to clamp it radially to the rim, the tubular portion of said ring extending radially beyond said outer flange a distance just sufficient to prevent removal of the deflated tire from the rim outwardly of the wheel whereby to prevent theft of the tire when the wheel is on its axle, and said tubular portion projecting laterally beyond the outer flange of the rim to protect the tire against side abrasion.

GEORGE W. SCHATZMAN.